M. GOHLKE.
FOOTSTEP BALL BEARING.
APPLICATION FILED JULY 30, 1908.

933,974.

Patented Sept. 14, 1909.
2 SHEETS—SHEET 1.

WITNESSES:
Fred White
René Puine

INVENTOR:
Max Gohlke,
By Attorneys,

M. GOHLKE.
FOOTSTEP BALL BEARING.
APPLICATION FILED JULY 30, 1908.

933,974.

Patented Sept. 14, 1909.
2 SHEETS—SHEET 2.

WITNESSES:
Fred White
René Bluine

INVENTOR:
Max Gohlke,
By Attorneys,

UNITED STATES PATENT OFFICE.

MAX GOHLKE, OF BERLIN, GERMANY, ASSIGNOR TO DEUTSCHE WAFFEN-UND MUNITIONSFABRIKEN, OF BERLIN, GERMANY.

FOOT-STEP BALL-BEARING.

933,974.

Specification of Letters Patent. Patented Sept. 14, 1909.

Application filed July 30, 1908. Serial No. 446,177.

*To all whom it may concern:*

Be it known that I, MAX GOHLKE, a subject of the King of Prussia, residing in Berlin, in the Kingdom of Prussia, German Empire, have invented certain new and useful Improvements in Foot-Step Ball-Bearings, of which the following is a specification.

This invention relates to a foot-step ball bearing having several rows of balls running in separate race rings and the invention consists essentially in distributing the load on the rows of balls by an intermediate pliable pressure part. This pressure part may consist either of a closed ring provided with radial outcut parts or it may be formed of separate ring segments which are yieldingly held together in a suitable manner on one of the race rings.

The accompanying drawings illustrate the present invention as applied to a two row ball bearing.

Figure 1:
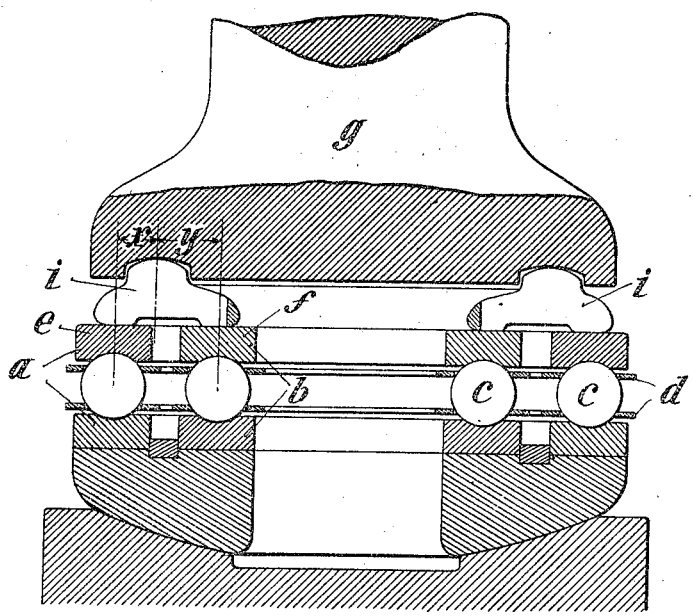
Figure 2:
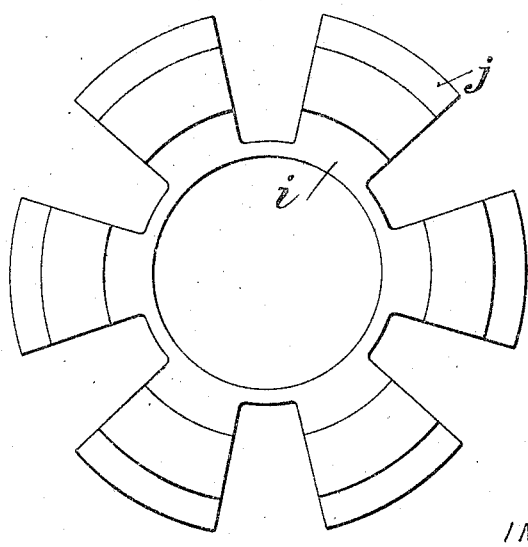
Figure 3:
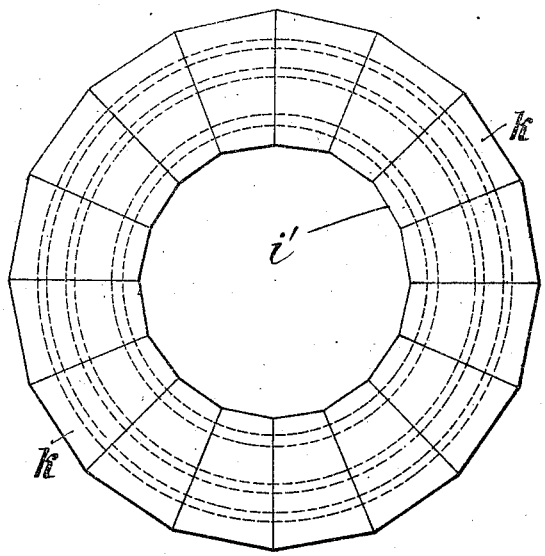

Figure 1 is a vertical section through the bearing, Fig. 2 is a plan of the ring shaped pressure part, and Fig. 3 is a plan of a pressure part formed of a number of segments separated from each other.

The foot-step ball bearing shown consists of two separate concentric bearings $a$ and $b$ of different diameters. The arrangement of the balls $c$ and cages $d$ is as usual. On the two top race rings $e$ and $f$ of the bearing is located the pressure part, by means of which the whole of the pressure of the shaft is transmitted from the part $g$ to the rows of balls. The pressure part is as shown, formed of a ring $i$ having one bearing surface at the top for the part $g$ and two bearing surfaces at the bottom for the two race rings $e$ and $f$. The points of pressure of the latter surfaces lie above the centers of the balls. The ring $i$ as shown has spaces around its exterior so that the parts $j$ supporting the bearing surfaces or points of pressure project like rays from the closed part of the ring. In this manner a certain amount of elasticity is imparted to the parts $j$, so that slight inaccuracies of workmanship in the height of the lower pressure surfaces of the ring $i$ are compensated. This is of great importance for the distribution of the whole load in correspondence with the carrying capability of the individual bearings. This distribution of pressure is effected by the relative tilting movements of the individual sections of the pliable pressure member. Such a distribution of the load could hardly be obtained with a complete rigid pressure ring $i$ even with the most accurate workmanship. The ring $i$ might also be formed of separate sections $k$ held together in any suitable manner on a race ring, in such manner however as to allow a slight rocking movement. This construction is shown in Fig. 3.

The present foot-step ball bearing is safer in use with great loads than was hitherto possible with foot-step bearings.

What I claim as my invention and desire to secure by patent is:

1. In a foot step ball bearing or the like, the combination of two rows of balls concentrically arranged, two race rings, and a pressure member comprising a series of sections adapted to move slightly with relation to each other, said pressure member contacting with said race rings, and being adapted to transmit pressure substantially axially thereto, and said pressure member having a reduced bearing face upon its opposite side adapted to receive one of the pressure parts of said bearing.

2. In a foot step ball bearing or the like, the combination of two rows of balls concentrically arranged, two race rings, and a pressure member comprising a series of sections adapted to move slightly with relation to each other, said pressure member contacting with said race rings, and being adapted to transmit pressure substantially axially thereto, and said pressure member having a reduced bearing face upon its opposite side adapted to receive one of the pressure parts of said bearing and having its sections connected together on their inner sides.

3. In a foot step ball bearing or the like, the combination of two rows of balls, said rows being concentric and one of larger diameter than the other, two separate race rings, a pliable pressure member having two bearing surfaces on its under side, said surfaces contacting with said race rings, and said pressure member having a reduced bearing surface on its opposite side adapted to contact with one of the parts of said bearing, said bearing surface being so located radially of the pressure member as to distribute the load in a manner inversely proportioned to the diameters of said rows of balls, and said pressure member having an inner continuous ring-shaped portion and radiating sectional portions separated by intervening spaces.

In witness whereof, I have hereunto signed my name in the presence of two subscribing witnesses.

MAX GOHLKE.

Witnesses:
 ROBERT MICHELSKI,
 WOLDEMAR HAUPT.